United States Patent Office 2,745,715
Patented May 15, 1956

2,745,715

PROCESS OF PRECIPITATING SUBSTANTIALLY ANHYDROUS CALCIUM CHROMATE

Holbert E. Dunn, Crafton, and Ellis J. O'Brien, Pittsburgh, Pa., assignors to Vanadium Corporation of America, New York, N. Y., a corporation of Delaware No Drawing. Application March 4, 1953, Serial No. 340,401

3 Claims. (Cl. 23—56)

This invention relates to a process of precipitating substantially anhydrous calcium chromate from sodium chromate solutions. The sodium chromate solutions may result from roasting and/or leaching chrome ores, slags, pulverized ferrochromium or other chromium bearing materials. The process relates more particularly to improvements in the precipitation of substantially anhydrous calcium chromate by treating sodium chromate solutions with calcium chloride.

Heretofore, calcium chromate has found rather limited use in the preparation of other pigments and has been usually marketed in the form of dihydrate, $CaCrO_4 \cdot 2H_2O$, molecular weight 192.12, comprising 81.25% $CaCrO_4$ and 18.75% $H_2O$ in yellow monoclinic prism or rhombic crystal form, soluble in water to the extent of 14.0 to 20.3 grams per 100 grams of water at 20° C. Because of its solubility and high water content this chromate is not suitable for direct application in ceramic and paint pigments or as a pyrometallurgical oxidant.

According to a known process, a calcium chloride solution is added to a sodium chromate solution and the mixed solution is heated to precipitate calcium chromate. The reaction may be represented by the following equation:

(1) $Na_2CrO_4 + CaCl_2 = CaCrO_4 + 2NaCl$

Calcium chromate monohydrate $CaCrO_4 \cdot H_2O$ can be made by carrying out the reaction at atmospheric pressure and completing the reaction at a pH of about 6.5–7.0 by mixing sodium chromate solution containing, say, 75.5 grams per liter chromium with calcium chloride to the extent of an excess of 20 to 50% of theoretical requirements, and heating the mixed solutions to boiling. The product is in rhombic crystalline form containing 90.3% calcium chromate and 9.7% $H_2O$, which corresponds closely to the monohydrate $CaCrO_4 \cdot H_2O$. However, only about 61% of the chromium content can be precipitated by this method in which the reaction is carried out and completed at a pH of about 6.5 to 7.0.

According to the present invention, a substantially anhydrous calcium chromate, much less soluble in water can be precipitated from sodium chromate solutions with a high degree of purity and efficiency. In carrying out the process the alkalinity of the sodium chromate solution is adjusted by adding sodium hydroxide or other suitable alkali in an amount such that when the calcium chloride solution and the sodium chromate solution are mixed and heated to complete the reaction, the final pH of the slurry is between 9 and 12, the preferred pH being between 10 and 11. If the pH of the slurry is lower than 10, a lower recovery is obtained although at a pH of 9 the results are still acceptable. On the other hand, if the pH of the slurry is greater than 11, the process becomes more costly, because of excessive soda cost, and the calcium chromate product becomes more contaminated with sodium. Above a pH of about 12, this contamination becomes serious.

The sodium chromate solution to which alkali has been added, and the calcium chloride solution are preheated separately to a temperature of 120–190° F., the preferred preheating temperature being about 150–170° F., and the two solutions are then mixed together, using an amount of calcium chloride which is at least 120% of the stoichiometric requirements of calcium chloride for precipitating the chromium as calcium chromate in accordance with Equation 1. The resulting slurry is then heated at a temperature of 200–215 F. to precipitate substantially anhydrous calcium chromate. If the final pH of the slurry is 10 to 11, the precipitating efficiency is 93–95%. The product is somewhat contaminated with calcite but it is substantially anhydrous in that, exclusive of the calcium carbonate it contains about 97.8% of calcium chromate and 2.0% of water. It is in the form of uniform, granular, rhombic dipyramids, the product having no binding power when merely moistened with water and compressed at, for example, 9000 p. s. i. and subsequently baked at 450° F., which is normal briquetting practice.

In order to produce a calcium chromate having a lower content of calcium carbonate (calcite), caustic soda low in $CO_2$ should be used rather than the commercial flake caustic soda and the usual precautions taken to avoid absorption of $CO_2$ from the air, otherwise our calcium chromate product may carry as much as 8% calcium carbonate, when made from commercial grade reagents.

It will be seen that in accordance with our invention the sodium chromate and the calcium chloride solutions are separately preheated to 120 to 190° F. Furthermore, that the reaction of precipitating calcium chromate is carried out at a pH of 9–12, preferably between 10 and 11, which is much higher than the pH of 6.5–7.0 employed according to the prior art. In this manner, the precipitation efficiency is increased from a value of about 61% to a value of about 93–95%. Furthermore, the prior practice resulted in a product corresponding closely to the monohydrate $CaCrO_4 \cdot H_2O$ containing 9.7% $H_2O$, whereas the present method results in a substantially anhydrous product containing only about 2% of water, which is of considerable advantage when the product is used for pyrometallurgical purposes.

The following is an example illustrating our process:

205 grams of $Na_2Cr_2O_7$ were dissolved in 800 grams of water and then 55 grams of solid NaOH were added to the solution. Thereafter 26 grams of NaOH as a 10% solution were added. The NaOH converted the $Na_2Cr_2O_7$ into $Na_2CrO_4$. This sodium chromate solution is hereinafter referred to as "Solution No. 1."

"Solution No. 2" was made by dissolving 340 grams of $CaCl_2$ in 1000 cc. of water.

Solutions 1 and 2 were each heated separately to 160° F. and then mixed. They were then heated to 210° F. in 20 minutes and held at 210° F. for 15 minutes. The final pH of the slurry was 11.0. The precipitation efficiency was 95.8%. The product, when dried at 230° F. to remove free moisture, analyzed:

89.55% $CaCrO_4$
0.18% $SiO_2$
0.07% $Al_2O_3$
0.15% $Na_2O$
0.08% Cl and contained only 2.0% combined moisture when ignited at 1000° F.

This product was found to be uniformly fine granular rhombic dipyramids, 10 to 15 microns in size, having a bulking density of 53.87 pounds per cubic foot, which when moistened and briquetted at 9000 p. s. i., and baked at 450° F., under normal briquetting practice, pulverized upon a 4 foot drop test, indicated no worthwhile bonding power, but because of its substantially anhydrous character and high bulking density, is suitable for ceramic or metallurgical use, with a suitable binder if desired.

This application is related to our copending applications Serial Nos. 340,402; 340,403 and 340,404, all filed March 4, 1953.

The invention is not limited to the preferred embodiment but may be otherwise embodied or practiced within the scope of the following claims.

We claim:

1. The process of precipitating substantially anhydrous calcium chromate, which comprises preheating sodium chromate solution to 120–190° F., preheating calcium chloride solution to 120–190° F., adding alkali to the sodium chromate solution in such amount that after the sodium chromate solution and the calcium chloride solution are mixed and heated to complete the reaction, the final slurry will have a pH of 9–12, mixing the calcium chloride solution and the sodium chromate solution in an amount of at least 120% of the stoichiometric requirements of calcium chloride for precipitating calcium chromate, and heating the resulting slurry at atmospheric pressure and at a temperature of 200–215° F. to precipitate anhydrous calcium chromate.

2. The process of precipitating substantially anhydrous calcium chromate, which comprises preheating sodium chromate solution to 120–190° F., preheating calcium chloride solution to 120–190° F., adding alkali to the sodium chromate solution in such amount that after the sodium chromate solution and the calcium chloride solution are mixed and heated to complete the reaction, the final slurry will have a pH of 10.0–11.0, mixing the calcium chloride solution and the sodium chromate solution in an amount of at least 120% of the stoichiometric requirements of calcium chloride for precipitating calcium chromate, and heating the resulting slurry at atmospheric pressure and at a temperature of 200–215° F. to precipitate anhydrous calcium chromate.

3. A process according to claim 2, wherein the sodium chromate solution and the calcium chloride solution are preheated to a temperature of 150–170° F.

References Cited in the file of this patent

UNITED STATES PATENTS 2,493,789     Udy  ---------------- Jan. 10, 1950

OTHER REFERENCES

Mellor: "Comprehensive Treatise on Inorganic and Theoretical Chemistry," vol. 11, page 267, Longmans, Green and Co., N. Y. C., 1931.